United States Patent
Zitting

(10) Patent No.: US 6,595,524 B1
(45) Date of Patent: Jul. 22, 2003

(54) PRESSURE REGULATING BUFFER SEAL

(75) Inventor: Daniel K. Zitting, St. George, UT (US)

(73) Assignee: Macrotech Polyseal, Inc., Salt Lake City, UT (US)

(*) Notice: Subject to any disclaimer, the term of this patent is extended or adjusted under 35 U.S.C. 154(b) by 82 days.

(21) Appl. No.: 09/669,973

(22) Filed: Sep. 25, 2000

(51) Int. Cl.⁷ .................. B60T 11/236; F16J 9/20; F16J 15/26; F16J 15/32
(52) U.S. Cl. ............... 277/436; 277/437; 277/510; 277/552; 277/558; 277/928
(58) Field of Search ............ 277/436, 437, 277/447, 448, 552, 558, 589, 468, 510, 928

(56) References Cited

U.S. PATENT DOCUMENTS

| | | | |
|---|---|---|---|
| 2,981,232 A | * | 4/1961 | Peras .................. 277/436 |
| 3,109,661 A | * | 11/1963 | Swaim et al. ............. 277/589 |
| 3,214,182 A | * | 10/1965 | Herbruggen ............ 277/465 |
| 3,601,419 A | * | 8/1971 | Fern ..................... 277/436 |
| 4,032,159 A | | 6/1977 | Zitting |
| 4,067,407 A | | 1/1978 | Berg |
| 4,089,534 A | | 5/1978 | Litherland |
| 4,105,214 A | | 8/1978 | Schexnayder |
| 4,190,259 A | | 2/1980 | Zitting |
| 4,201,392 A | | 5/1980 | Watts |
| 4,252,331 A | * | 2/1981 | Siegel .................. 277/586 |
| 4,284,280 A | * | 8/1981 | Bertram et al. ............ 277/436 |
| 4,298,203 A | | 11/1981 | Hölzer et al. |
| 4,352,498 A | | 10/1982 | Burke et al. |
| 4,426,090 A | | 1/1984 | Bender |
| 4,458,717 A | * | 7/1984 | Boland ................. 137/496 |
| 4,504,068 A | | 3/1985 | Hölzer |
| 4,553,761 A | | 11/1985 | Blesing et al. |
| 4,566,703 A | | 1/1986 | Zitting |
| 4,577,874 A | | 3/1986 | Zitting |
| 4,652,000 A | | 3/1987 | O'Rourke |
| 4,702,482 A | | 10/1987 | Oseman |
| 4,736,586 A | | 4/1988 | Kawajiri et al. |
| 4,858,937 A | | 8/1989 | Fairlie-Clarke et al. |
| 4,893,823 A | | 1/1990 | Strouse et al. |
| 4,900,042 A | | 2/1990 | Genda |
| 4,921,258 A | * | 5/1990 | Fournier et al. ............ 137/217 |
| 5,082,295 A | | 1/1992 | Wetzel |
| 5,088,745 A | | 2/1992 | Peppiatt et al. |
| 5,127,661 A | * | 7/1992 | Franson et al. ............ 277/552 |
| 5,143,382 A | * | 9/1992 | Maringer ............... 277/584 |
| 5,257,432 A | | 11/1993 | Duke |
| 5,332,234 A | | 7/1994 | Forch et al. |
| 5,482,296 A | | 1/1996 | Peppiatt et al. |
| 5,507,505 A | | 4/1996 | von-Arndt et al. |
| 5,524,905 A | | 6/1996 | Thoman et al. |
| 5,575,484 A | | 11/1996 | Burke |
| 5,664,651 A | | 9/1997 | Miura et al. |
| 5,879,010 A | | 3/1999 | Nilkanth et al. |
| 5,938,207 A | | 8/1999 | Marchionna et al. |
| 5,984,313 A | | 11/1999 | Kraus |
| 6,036,193 A | | 3/2000 | Onuma et al. |
| 6,098,987 A | | 8/2000 | McBride |
| 6,113,108 A | * | 9/2000 | Friend et al. ............. 277/549 |
| 6,129,358 A | * | 10/2000 | Kiesel et al. ............. 277/436 |
| 6,290,235 B1 | * | 9/2001 | Albertson ............... 277/510 |

* cited by examiner

*Primary Examiner*—Anthony Knight
*Assistant Examiner*—Vishal Patel
(74) *Attorney, Agent, or Firm*—TraskBritt

(57) ABSTRACT

A buffer seal adapted for use in a seal assembly including at least a primary seal, the seal assembly being adapted to provide a fluid seal between two relatively moving machine elements, such as a piston or rod of a first machine element moving within a cylindrical bore of a second machine element. The buffer seal comprises a sealing element and a resiliently deformable biasing element. The material, shape, and/or volume of the biasing element are selected to provide a desired biasing force sufficient to maintain a surface of the sealing element in sealing contact with a surface of the first machine element and to simultaneously maintain another surface of the sealing element in sealing contact with a surface of the second machine element. In one embodiment, the buffer seal may be configured such that axial movement and tilting of the buffer seal within its associated gland are substantially eliminated. In another embodiment, the buffer seal may be configured to control the back pressure in the region between the buffer seal and the primary seal and to maintain the back pressure at a specified threshold pressure. The buffer seal may be further configured to inhibit the migration of system contaminants to the primary seal.

16 Claims, 4 Drawing Sheets

PRESSURE REGULATING BUFFER SEAL

BACKGROUND OF THE INVENTION

1. Field of the Invention

The present invention relates generally to sealing elements for hydraulic and pneumatic machine elements. Specifically, the present invention relates to a buffer seal for providing a fluid seal between relatively moving parts, such as a piston or rod moving within a bore and, in particular, the present invention relates to a buffer seal providing a controlled pressure at a primary seal.

2. State of the Art

Seals adapted to provide a fluid seal between two relatively moving machine elements are well known in the art. For example, one or more sealing elements are commonly used to provide a fluid seal between a piston or rod moving within, and relative to, a bore extending through a housing or other machine element. Although a single seal may be disposed between an outer cylindrical surface of the piston or rod and an inner cylindrical surface of the bore, it is a common practice to employ a combination of two or more sealing elements (i.e., a seal assembly) to provide a robust fluid seal between the two relatively moving machine elements.

A conventional seal assembly is shown in FIG. 1. The conventional seal assembly 5 is configured to provide a fluid seal between, for example, a rod 11 of a first machine element 10 moving within a bore 21 of a second machine element 20 and relative thereto. Although the first machine element 10 is shown including a rod 11 and the second machine element 20 is shown including a bore 21, it will be appreciated by those of ordinary skill in the art that each of the first and second machine elements 10, 20, respectively, may be comprised of multiple machine parts or elements. For example, the rod 11 of first machine element 10 may comprise two or more separately formed parts that are subsequently attached to one another to form the assembled rod 11.

The rod 11 and bore 21 of the first and second machine elements 10, 20, respectively, are generally mutually concentric to a central longitudinal axis 15. Further, the rod 11 of first machine element 10 and the bore 21 of second machine element 20 are cooperatively dimensioned to enable the rod 11 and bore 21 to slide and/or rotate relative to one another. A clearance gap 90 between an outer cylindrical surface 12 of the rod 11 and an inner cylindrical surface 22 of the bore 21 enables relative motion between the rod 11 and bore 21. It should be noted that in FIG. 1 the size of the clearance gap 90 has been exaggerated for clarity; however, those of ordinary skill in the art will understand that such a clearance gap 90 may, in practice, be extremely small in comparison to the dimensions of the rod 11 and bore 21. For example, the clearance between the outer cylindrical surface 12 of the rod 11 and the inner cylindrical surface 22 of bore 21 may be on the order of a few thousandths of an inch or less.

Relative motion between the first machine element 10 and the second machine element 20 may be the result of the rod 11 traveling longitudinally along axis 15 through the bore 21 of a relatively stationary second machine element 20 or the result of the second machine element 20 traveling longitudinally along axis 15 over a rod 11 of a relatively stationary first machine element 10. Alternatively, relative motion between the first and second machine elements 10, 20 may be the result of longitudinal travel of both the first and second machine elements 10, 20, respectively, along axis 15. Also, relative motion between the first machine element 10 and second machine element 20 may be the result of relative rotary motion between the first and second machine elements 10, 20, or the result of a combination of relative longitudinal motion and relative rotary motion therebetween.

The seal assembly 5 comprises a wiper 30, a primary seal 50, and a buffer seal 70. The wiper 30 is disposed in an annular groove or gland 40, formed about the circumference of the inner cylindrical surface 22 of the bore 21 extending through second machine element 20. Similarly, the primary seal 50 is disposed in a gland 60 formed about the circumference of the inner cylindrical surface 22 of bore 21 and the buffer seal 70 is disposed in a gland 80 formed about the circumference of the inner cylindrical surface 22 of bore 21. Although the glands 40, 60, 80 are shown disposed about the inner cylindrical surface 22 of bore 21, and the wiper 30, primary seal 50, and buffer seal 70 disposed therein, respectively, it should be understood by those of ordinary skill in the art that one or more of the glands 40, 60, 80 could be disposed about the circumference of the outer cylindrical surface 12 of the rod 11 of first machine element 10.

The wiper 30 is a generally ring-shaped member disposed in the gland 40. The wiper 30 is adapted to prevent the ingress of solid particulates and other contaminants into the clearance gap 90 from the ambient side 92 of the seal assembly 5 (i.e., the end of the seal assembly 5 exposed to ambient environmental conditions) to a region 94 between the wiper 30 and the primary seal 50 where such contaminants could potentially damage or inhibit proper functioning of the primary seal 50. Wipers for use in hydraulic and pneumatic fluid sealing applications are well known in the art.

The purpose of the primary seal 50 disposed in gland 60 is to prevent the flow of fluid from the system side 98 of the seal assembly 5 (i.e., the end of the seal assembly 5 exposed to pressurized fluid) and through the clearance gap 90 to the ambient side 92 of the seal assembly 5. Any leakage of fluid past the primary seal 50 to the ambient side 92 of the seal assembly 5 may compromise system fluid pressure and operation. For example, the proper functioning of a hydraulically-actuated piston used to apply a load over a specified distance (e.g., hydraulic cylinders on construction equipment) depends upon the maintenance of system fluid pressure. Seals adapted for use as a primary seal 50 in hydraulic and pneumatic fluid sealing applications are well known in the art. These seals may be statically loaded or, alternatively, dynamically loaded during operation.

A statically loaded seal typically comprises a generally ring-shaped, resiliently elastic body exhibiting a geometry adapted to provide a necessary sealing force. For example, with reference to FIG. 1, a statically loaded primary seal 50 may comprise a resilient body disposed in the gland 60 and having a geometry such that, upon insertion of the rod 11 into the bore 21 of the first and second machine elements 10, 20, respectively, the resilient body deforms or compresses and exerts radially inward-directed forces about the circumference of the outer cylindrical surface 12 of the rod 11. The resilient body further exerts corresponding radially outward-directed forces about the circumference of the outer wall 61 of the gland 60 and/or exerts longitudinally directed forces about the periphery of one or both of the side walls 62, 63 of the gland 60. The forces exerted by the resilient body against the outer cylindrical surface 12 of the rod 11 and one or more of the walls 61, 62, 63 of the gland 60 prevent, or at least substantially inhibit, the flow of fluid around the resilient body. Therefore, fluid pressure on such a statically loaded seal is unnecessary for the statically loaded seal to maintain a fluid seal and, further, excessive system pressure on a statically loaded seal can cause high friction, heat generation, increased wear, and reduced seal life.

A dynamically loaded seal typically comprises a generally ring-shaped, resiliently elastic body. However, the resilient body is configured to provide a necessary sealing force, or at least a significant portion of the sealing force, when subjected to system fluid pressure. The resilient body may include a structure, such as a cylindrical lip, adapted to impinge against a surface of a machine element when acted upon by pressurized fluid. By way of example with reference to FIG. 1, a dynamically loaded primary seal 50 may comprise a resilient body disposed in the gland 60 and configured to impinge against one or more of the walls 61, 62, 63 of the gland 60 about the periphery thereof, respectively, to provide a fluid seal between the resilient body and the gland 60. The resilient body further includes a feature, such as a lip structure extending about a circumference thereof as noted above, that deforms and exerts radially inward-directed forces about the circumference of the outer cylindrical surface 12 of the rod 11 when acted upon by pressurized fluid. Thus, proper functioning of such a dynamically loaded primary seal 50 requires that a minimum threshold system fluid pressure be maintained. Although the threshold fluid pressure must be maintained for proper functioning of a dynamically loaded seal, excessive pressure on such a seal can lead to high friction, heat generation, increased wear, and reduced seal life as indicated above for a statically loaded seal.

Although statically loaded and dynamically loaded seals were described separately above, those of ordinary skill in the art will understand that, in practice, fluid seals often exhibit a combination of loading characteristics. For example, a statically loaded seal will typically experience at least some dynamic loading during operation and a dynamically loaded seal will typically exhibit at least some static loading. Thus, a primary seal 50 may include geometry adapted to exert sealing forces about the circumference of the outer cylindrical surface 12 of the rod 11 and about the periphery of one or more of the walls 61, 62, 63 of the gland 60 and may further include structure, such as a lip as described above, that provides additional sealing forces when subjected to system fluid pressure.

The primary seal 50 may also include an anti-extrusion ring 52 configured to prevent the body of the primary seal 50 which, as suggested above, is typically a compliant material, from being extruded into the clearance gap 90 as a result of high system pressure or relative movement of the primary seal 50 within gland 60, or a combination thereof. The anti-extrusion ring 52 is typically constructed of a material relatively harder and more rigid than the material used to construct the body of the primary seal 50.

As noted above, the conventional seal assembly 5 also includes a buffer seal 70. The buffer seal 70 is a generally ring-shaped body disposed in a third gland 80 formed about the circumference of the inner cylindrical surface 22 of the bore 21 extending through second machine element 20. Although shown in FIG. 1 as having a generally rectangular cross-section, such a conventional buffer seal 70 may have any suitable cross-sectional shape or configuration as known in the art. Also, the buffer seal 70 may include an anti-extrusion ring 72 as described above.

The buffer seal 70 is disposed between the system side 98 of the seal assembly 5 and the primary seal 50. The primary function of the buffer seal 70 is to prevent extreme system pressure conditions from acting upon the primary seal 50 and causing failure of, or damage to, the primary seal 50. Such an extreme pressure condition may include, for example, a high-pressure spike propagating through the system side 98 of the seal assembly 5 that impacts the seal assembly 5. Also, if excessive pressure builds up in the region 96 between the buffer seal 70 and the primary seal 50 (i.e., "back pressure") the buffer seal 70 should vent the back pressure to the system side 98 of the buffer seal 70. Further, the buffer seal 70 should prevent solid particulates and other contaminants on the system side 98 of the seal assembly 5 from reaching the primary seal 50 and causing damage to, or failure of, the primary seal 50.

Although seal assemblies comprised of a wiper, primary seal, and buffer seal, such as the seal assembly 5 shown in FIG. 1, are well known in the art, such seal assemblies are prone to failure due to deficiencies in operation of the buffer seal. A common problem with conventional buffer seals is that the buffer seal simply does not sufficiently dampen high-pressure spikes propagating through the system. Conventional buffer seals 70 exhibit a deformed or compressed axial thickness that is less than an axial thickness of the gland 80 in which the buffer seal 70 is retained, such that a gap 74 exists between the side walls 82, 83 of the gland 80 and the buffer seal 70. Thus, the buffer seal 70 is allowed to float within the gland 80, enabling the buffer seal 70 to travel axially along axis 15 within the gland 80 between the side walls 82, 83 thereof and further enabling the buffer seal 70 to rotate or tilt within the gland 80. It is believed that the ability of the conventional buffer seal to axially travel and/or tilt within its mating gland is, at least in part, responsible for the failure to dampen high-pressure spikes.

The freedom to axially travel within a gland 80 can be especially problematic for conventional buffer seals 70 that, in addition to exhibiting sealing contact with the rod 11 of first machine element 10, exhibit sealing contact at only the contact interface between the buffer seal 70 and the side wall 83 of the gland 80 nearest the primary seal 50. A conventional buffer seal may be specifically designed to provide such a sealing contact with only the side wall 83 of the gland 80 nearest the primary seal 50, in which case the buffer seal 70 would not break sealing contact with the side wall 83 unless or until fluid accumulates in the region 96 between the buffer seal 70 and primary seal 50. However, travel of the rod 11 of first machine element 10 relative to the bore 21 of second machine element 20 may itself cause the conventional buffer seal 70 to fail. Travel of the rod 11 in a direction away from the primary seal 50 and toward the buffer seal 70 can axially displace the buffer seal 70 relative to its associated gland 80, thereby "pulling" the buffer seal 70 away from the side wall 83 of the gland 80 and breaking sealing contact therewith, enabling fluid to flow around the buffer seal 70 and potentially allowing high-pressure spikes to be transmitted to the primary seal 50.

Failing to adequately exclude system contaminants from the primary seal 50 is another problem exhibited by conventional buffer seals 70. The lack of a suitable volume or region in which solid particulates can collect or be trapped, as well as the inability of the anti-extrusion ring 72, if present, to exclude solid particulate matter, are believed to contribute to the inability of conventional buffer seals 70 to adequately exclude system contaminants from the primary seal 50.

A further problem with conventional buffer seals 70 is the inability to regulate the fluid pressure in the region 96 between the buffer seal 70 and the primary seal 50 (i.e., the back pressure). The inability to regulate or relieve the back pressure results in pressure trapping. Pressure trapping occurs when a high fluid pressure within the region between the buffer seal 70 and the primary seal 50 builds up during operation but the buffer seal 70 is unable to relieve this high back pressure or to maintain the back pressure at or below a desired operating pressure. Excessively high back pressure can cause a number of deleterious effects, including increased friction between the primary seal 50 and a relatively moving body, increased heat generation, increased wear, and reduced seal life. If the primary seal 50 is a dynamically loaded seal, the inability of the conventional buffer seal 70 to regulate the back pressure may also result in a condition in which the fluid pressure acting on the dynamically loaded primary seal 50 is insufficient for the primary seal 50 to maintain a fluid seal. Also, fluid trapped in the region 96 between the buffer and primary seals 70, 50 may itself provide a medium for propagating high-pressure spikes to the primary seal 50.

Thus, a need exists in the art for a buffer seal adapted for use in a seal assembly having a primary seal, the buffer seal being able to effectively and repeatably dampen out high-pressure spikes such that these high-pressure spikes do not impact the primary seal. A need also exists for a buffer seal capable of trapping solid particulates and other contaminates to exclude such contaminates from the primary seal. Further, a need exists for a buffer seal configured to regulate the back pressure, such that a minimum threshold back pressure can be maintained to dynamically load a primary seal while preventing the build up of excessively high back pressure that could be imparted to the primary seal.

SUMMARY OF THE INVENTION

The present invention encompasses a number of embodiments of a buffer seal adapted for use in a seal assembly including at least a primary seal. The seal assembly, including a buffer seal according to the invention, may be used to provide a fluid seal between two relatively moving machine elements, such as a piston or rod of a first machine element moving within a cylindrical bore of a second machine element.

An exemplary embodiment of a buffer seal according to the invention may comprise a sealing element and a biasing element. The sealing element is a generally ring-shaped body having at least one surface configured to contact a surface of the first machine element and to provide a fluid seal thereagainst and further having at least one surface configured to contact a surface of the second machine element and to provide a fluid seal thereagainst. The biasing element is a generally ring-shaped body constructed of a resiliently deformable material configured to impart a biasing force or sealing force against the sealing element. The material and volume of the biasing element are selected to provide a biasing force sufficient to simultaneously maintain the respective surfaces of the sealing element in contact with the surfaces of the first and second machine elements and, further, to minimize axial travel and tilting of the buffer seal within its associated gland, irrespective of the direction of relative travel between the first and second machine elements, thereby providing a robust fluid seal and dampening high-pressure spikes prior to impact with the primary seal.

In further embodiments of the invention, the sealing element may be configured to inhibit the migration of contaminants and debris from the system side of the seal assembly and around the buffer seal to the primary seal. In one embodiment, the sealing element may include a structure configured to act as a wiper or scraper against a surface of one of the first and second machine elements. In another embodiment, the sealing element may include a relief volume in which debris can be collected or trapped.

In yet another embodiment of a buffer seal according to the invention, the buffer seal may be configured as a pressure relief valve to provide a controlled back pressure in the region between the buffer and primary seals. The material, shape, and/or volume of the biasing element are selected such that, if the back pressure exceeds a specified threshold pressure, the buffer seal will release a controlled volume of fluid in order to restore the back pressure to the threshold pressure. To facilitate the release of fluid, the buffer seal may include a biasing element configured with a fluid path to allow fluid to flow around the buffer seal. Such a buffer seal configured to provide a controlled back pressure may be useful for seal assemblies including a predominantly dynamically loaded primary seal requiring a minimum operating pressure for proper functioning, as well as for seal assemblies including a predominantly statically loaded primary seal.

BRIEF DESCRIPTION OF THE SEVERAL VIEWS OF THE DRAWINGS

While the specification concludes with claims particularly pointing out and distinctly claiming that which is regarded as the present invention, the features and advantages of this invention can be more readily ascertained from the following detailed description of the invention when read in conjunction with the accompanying drawings, in which:

DETAILED DESCRIPTION OF THE INVENTION

Figure 2:
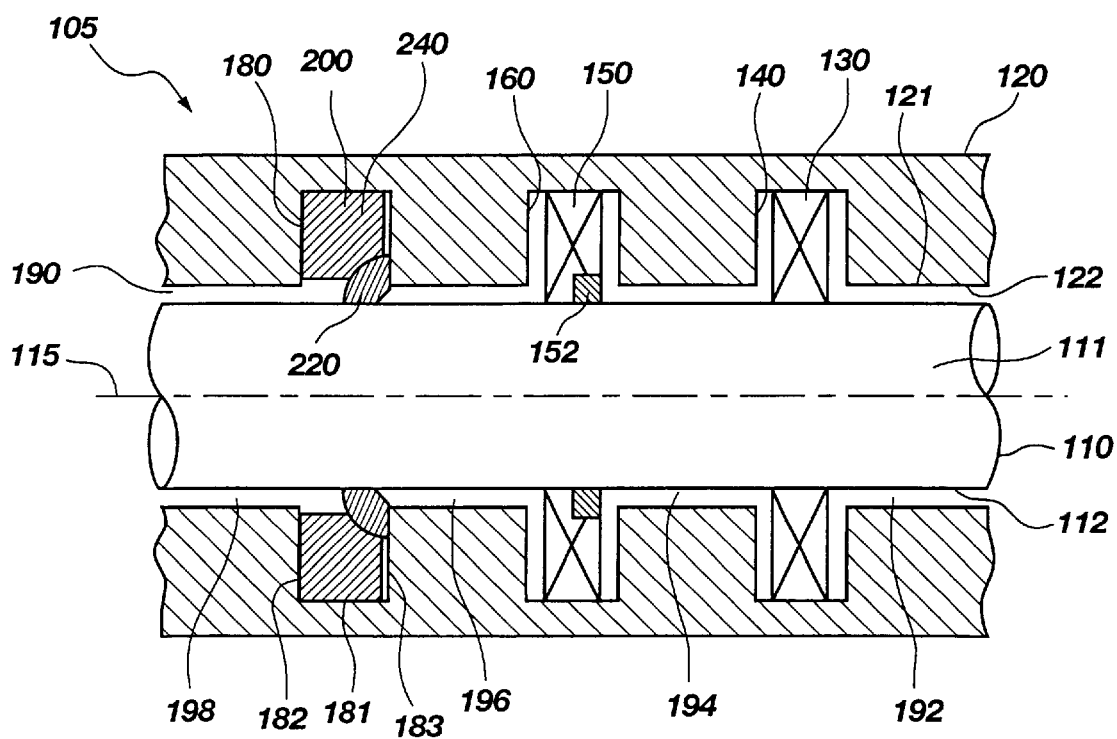
FIG. 2 shows a seal assembly including an exemplary embodiment of a buffer seal according to the present invention.
Figure 3:
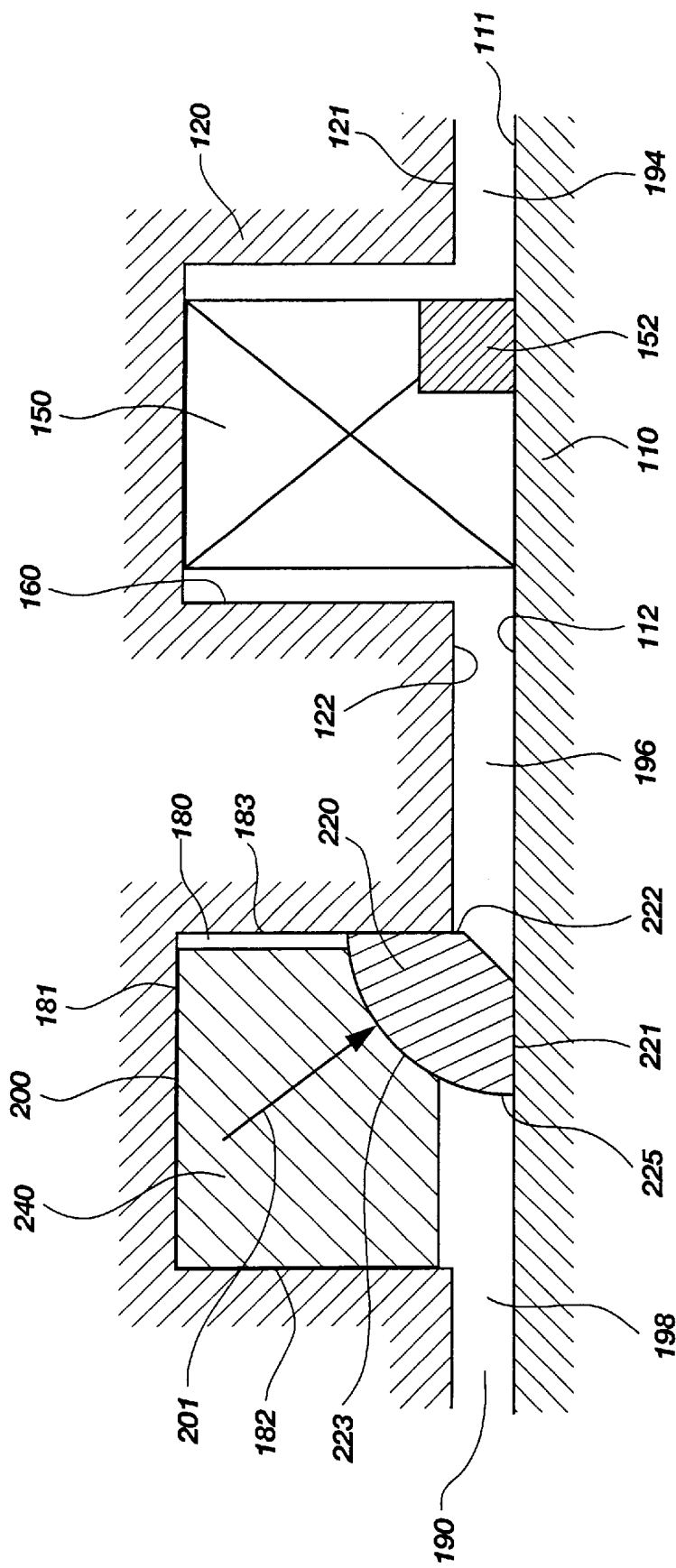
FIG. 3 shows a portion of the seal assembly of FIG. 2 including the exemplary embodiment of a buffer seal according to the present invention.

An exemplary embodiment of a buffer seal according to the present invention is shown in FIGS. 2 and 3. Referring to FIG. 2, the buffer seal 200 may form a portion of a seal assembly 105, the seal assembly 105 further including at least a primary seal 150. The seal assembly 105 may also include a wiper 130. The seal assembly 105 is configured to provide a fluid seal between, for example, a rod 111 of a first machine element 110 moving within, and relative to, a bore 121 of a second machine element 120. Although the first machine element 110 is shown including a rod 111 and the second machine element 120 is shown including a bore 121, it will be appreciated by those of ordinary skill in the art that each of the first and second machine elements 110, 120, respectively, may be comprised of multiple machine parts or elements. For example, the rod 111 of first machine element 110 may comprise two or more separately formed parts that are subsequently attached to one another to form the assembled rod 111.

The rod 111 and bore 121 are generally mutually concentric to a central longitudinal axis 115. Further, the rod 111 and bore 121 of the first and second machine elements 110, 120, respectively, are cooperatively dimensioned to enable the rod 111 and bore 121 to slide and/or rotate freely relative to one another. A clearance gap 190 between an outer cylindrical surface 112 of the rod 111 and an inner cylindrical surface 122 of the bore 121 enables relative motion between the rod 111 and bore 121. It should be noted that in FIGS. 2 and 3 the size of the clearance gap 190 has been exaggerated for clarity. However, those of ordinary skill in the art will understand that such a clearance gap 190 may, in practice, be extremely small in comparison to the dimensions of the rod 111 and bore 121. For example, the clearance between the outer cylindrical surface 112 of the rod 111 and the inner cylindrical surface 122 of bore 121 may be on the order of a few thousandths of an inch or less. The clearance required between the outer cylindrical surface 112 of the rod 111 and the inner cylindrical surface 122 of the bore 121 may be a function of machining tolerances, the respective materials selected, as well as their respective coefficients of thermal expansion (CTE) and the anticipated temperature range of operation.

Relative motion between the rod 111 of first machine element 110 and the bore 121 of second machine element 120 may be the result of the rod 111 traveling along axis 115 through the bore 121 of a relatively stationary second machine element 120 or the result of the second machine element 120 traveling along axis 115 over a rod 111 of a relatively stationary first machine element 110. Alternatively, relative motion between the first and second machine elements 110, 120, respectively, may be the result of travel of both the first and second machine elements 110, 120 along axis 115. Also, relative motion between the first machine element 110 and second machine element 120 may be the result of relative rotary motion between the first and second machine elements 110, 120, or the result of a combination of relative longitudinal motion and relative rotary motion therebetween.

As noted above, the seal assembly 105 comprises a buffer seal 200 according to the present invention and a primary seal 150 and, alternatively, may also include a wiper 130. The buffer seal 200 is disposed in a gland 180 formed about the circumference of the inner cylindrical surface 122 of bore 121 extending through second machine element 120. Similarly, the primary seal 150 is disposed in a gland 160 formed about the circumference of the inner cylindrical surface 122 of bore 121, and the wiper 130, if present, is disposed in a gland 140 formed about the circumference of the inner cylindrical surface 122 of bore 121. Although the glands 140, 160, 180 are shown disposed about the inner cylindrical surface 122 of bore 121, and the wiper 130, primary seal 150, and buffer seal 200 disposed therein, respectively, those of ordinary skill in the art will understand that one or more of the glands 140, 160, 180 could be disposed about the circumference of the outer cylindrical surface 112 of the rod 111.

The wiper 130 is a generally ring-shaped member configured to prevent the ingress of solid particulates and other contaminants into the clearance gap 190 from the ambient side 192 of the seal assembly 105 (i.e., the end of the seal assembly 105 exposed to ambient environmental conditions) to a region 194 between the wiper 130 and the primary seal 150 where such contaminants could potentially damage or inhibit proper functioning of the primary seal 150. The wiper 130 may comprise any suitable wiper for use in hydraulic and pneumatic fluid sealing applications as known in the art.

The primary seal 150 is a generally ring-shaped body configured to prevent the flow of fluid from the system side 198 of the seal assembly 105 (i.e., the end of the seal assembly 105 exposed to pressurized fluid) and through the clearance gap 190 to the ambient side 192 of the seal assembly 105. Primary seal 150 may, as depicted in FIGS. 2 and 3, include an anti-extrusive ring 152, the function of which has been discussed previously with respect to FIG. 1. Leakage of fluid past the primary seal 150 to the ambient side 192 of the seal assembly 105 may compromise system fluid pressure and operation. The primary seal 150 may be predominantly statically loaded, requiring minimal or no system fluid pressure to maintain a fluid seal or, alternatively, predominantly dynamically loaded, requiring a minimum threshold system fluid pressure in order to maintain a fluid seal as described above.

Figure 1:
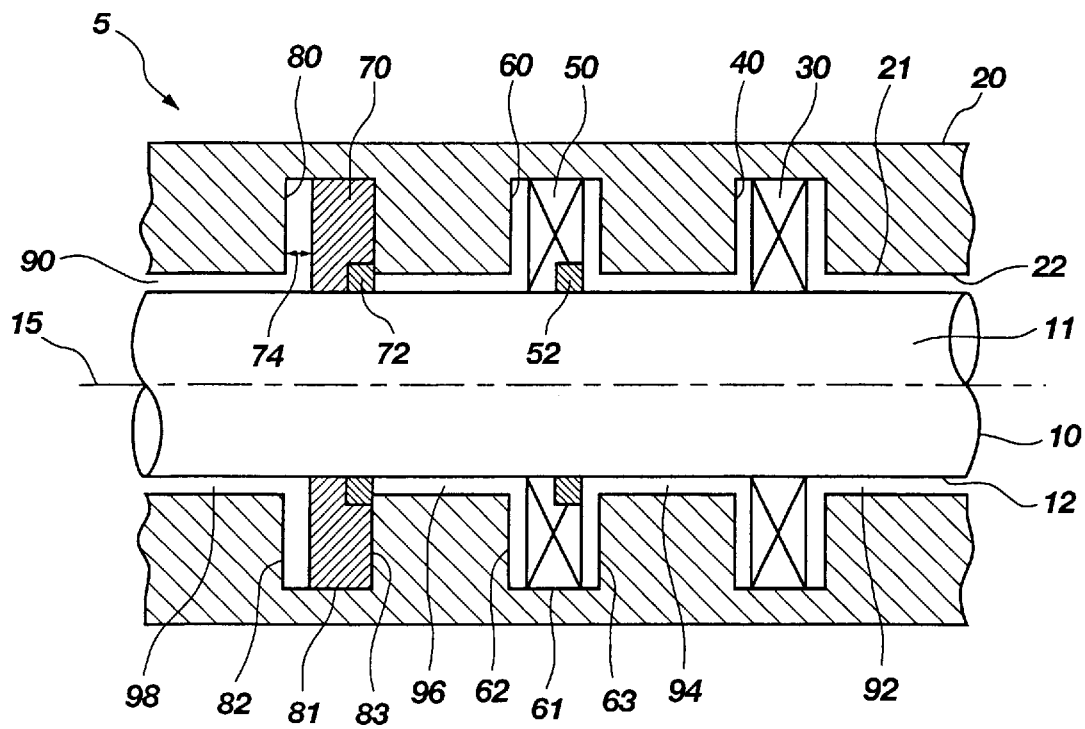
FIG. 1 shows a conventional seal assembly.

Thus, the seal assembly 105 is similar to the seal assembly 5 shown and described with respect to FIG. 1. However, the seal assembly 105 includes a novel buffer seal 200 according to the present invention, as will now be described in greater detail.

Referring to FIG. 3, the buffer seal 200 is disposed in a gland 180 as noted above. The gland 180 includes an outer wall 181, a side wall 182 on the system side 198 of the buffer seal 200 (i.e., the "upstream" side wall), and an opposing side wall 183 on the primary seal side region 196 of the buffer seal 200 (i.e., the "downstream" side wall). The buffer seal 200 comprises a sealing element 220 configured to provide a fluid seal between the rod 111 of first machine element 110 and the bore 121 of second machine element 120 and a biasing element 240 configured to impart a biasing, or sealing force 201 against the sealing element 220.

The sealing element 220 comprises a generally ring-shaped body constructed of a relatively hard (as compared to the biasing element 240) material. The sealing element 220 includes at least one surface 221 configured to engage the outer cylindrical surface 112 of the rod 111 of first machine element 110 and to provide a fluid seal therebetween upon application of the required biasing force 201. The sealing element 220 further includes at least one surface 222 configured to engage the downstream side wall 183 of the gland 180 in second machine element 120 and to provide a fluid seal therebetween upon application of the required biasing force 201. Also, at least one surface 223, or a portion thereof, of the sealing element 220 is configured to abut the biasing element 240.

The biasing element 240 comprises a generally ring-shaped body constructed of a resiliently deformable material. The biasing element 240 comprises a selected shape and/or volume of resilient material that, upon insertion of the buffer seal 200 into its associated gland 180 and insertion of the rod 111 of first machine element 110 in the bore 121 of second machine element 120, will be deformed or compressed to an extent necessary to impart a biasing force 201 against the surface 223 of sealing element 220 that is sufficient to maintain the fluid seal between the surface 221 of sealing element 220 and the outer cylindrical surface 112 of rod 111 and that is sufficient to simultaneously maintain the fluid seal between the surface 222 of sealing element 220 and the downstream side wall 183 of gland 180, regardless of the direction of travel of rod 111 within bore 121. Also, when deformed or compressed, the buffer seal 200 may include a surface in contact with each wall 181, 182, 183 of the gland 180 and a surface in contact with the outer cylindrical surface 112 of the rod 111. For example, as shown in FIGS. 2 and 3, the biasing element 240 may be in contact with the upstream side wall 182 and the outer wall 181 of the gland 180 and, as noted above, the sealing element 220 includes a surface 222 in contact with the downstream side wall 183 of the gland 180 and another surface 221 in contact with the outer cylindrical surface 112 of the rod 111.

Thus, in contrast to conventional buffer seals, the buffer seal 200 is constrained both axially and rotationally, eliminating both axial movement and tilting of the buffer seal 200 within its associated gland 180. Further, and also in contrast to conventional buffer seals, relative movement between the rod 111 of first machine element 110 and the bore 121 of second machine element 120 will not "pull" the buffer seal 200 out of sealing contact with its associated gland 180. Therefore, because the biasing element 240 is configured (such as, by selection of the appropriate material, shape, and/or volume) to maintain surfaces 221, 222 of the sealing element 220 in simultaneous contact with both the rod 111 of first machine element 110 and the gland 180 in second machine element 120, irrespective of the relative movement of rod 111, and, further, because the buffer seal 200 is constrained both axially and rotationally, a robust fluid seal is maintained between the first and second machine elements 110, 120. Thus, the buffer seal 200 substantially, or at least partially, dampens high-pressure spikes propagating through the clearance gap 190 from the system side 198 of the seal assembly 105 and toward the primary seal 150 prior to impact with the primary seal 150.

In another embodiment, the sealing element 220 includes structure configured to prevent the ingress of contaminants through clearance gap 190 and into the region 196 between the buffer seal 200 and the primary seal 150. For example, the sealing element 220 may include a sharp edge 225 (see FIG. 3) engaging the outer cylindrical surface 112 of the rod 111 and configured to scrape or wipe contaminants from the outer cylindrical surface 112 of rod 111 in order to prevent the contaminants from migrating underneath or around the buffer seal 200. Any other suitable structure known in the art adapted to exclude contaminants from the primary seal 150 may be incorporated onto the sealing element 220.

In a further embodiment, the buffer seal 200 is configured to provide a controlled back pressure in the region 196 between the buffer seal 200 and the primary seal 150. As noted above, the primary seal 150 may be predominantly statically loaded or, alternatively, predominantly dynamically loaded. If the primary seal 150 is predominantly statically loaded, it is desirable to maintain a minimum back pressure in the region 196 between the buffer and primary seals 200, 150, as excessive fluid pressure exerted against a statically loaded seal can significantly increase friction and reduce the useful life of the seal. If the primary seal 150 is predominantly dynamically loaded, it would be desirable to maintain the back pressure above a threshold pressure level necessary for the dynamically loaded seal to properly function and provide a fluid seal. For a dynamically loaded primary seal 150, however, excessive back pressure is also undesirable as noted above.

To maintain the back pressure at a desired pressure level, the material and volume of the biasing element 240 may be selected to provide a biasing force 201 against the sealing element 220 that can be overcome by an opposing force exerted against the sealing element 220 as a result of back pressure when the back pressure reaches a specified threshold value. In essence, the sealing element 220 and biasing element 240 are cooperatively functioning as a pressure relief valve. If the primary seal 150 exhibits dynamic loading, the material and volume of the biasing element 240 may be selected to maintain the back pressure at a specified threshold pressure necessary for proper functioning of the primary seal 150 and to relieve the back pressure only when the threshold pressure is exceeded. A typical threshold pressure for conventional dynamically loaded fluid seals is in the range of 30 to 50 psi. For a predominantly statically loaded primary seal 150, the material and volume of the biasing element 240 may be selected to relieve the back pressure when a minimum pressure level is exceeded. Thus, undesirable pressure trapping in the region 196 between the buffer seal 200 and primary seal 150 is substantially eliminated.

The biasing element 240 may be constructed of any suitable resiliently compressible material known in the art. For example, the biasing element 240 may comprise a urethane, natural or synthetic rubber, or any other suitable resilient polymer material known in the art. Further, the biasing element 240 may be of any suitable configuration, so long as the material characteristics and volume of the biasing element 240 are sufficient to provide the necessary biasing force 201 against sealing element 220 as described above. In other words, when the buffer seal 200 is disposed in the gland 180 and the rod 111 of first machine element 110 is inserted into the bore 121 of second machine element 120 and, accordingly, when the biasing element 240 is constrained by the walls 181, 182, 183 of gland 180 and the surface 223 of the sealing element 220, the energy stored in the biasing element 240, due to deformation or compression thereof, must provide the required biasing force.

Figure 4:
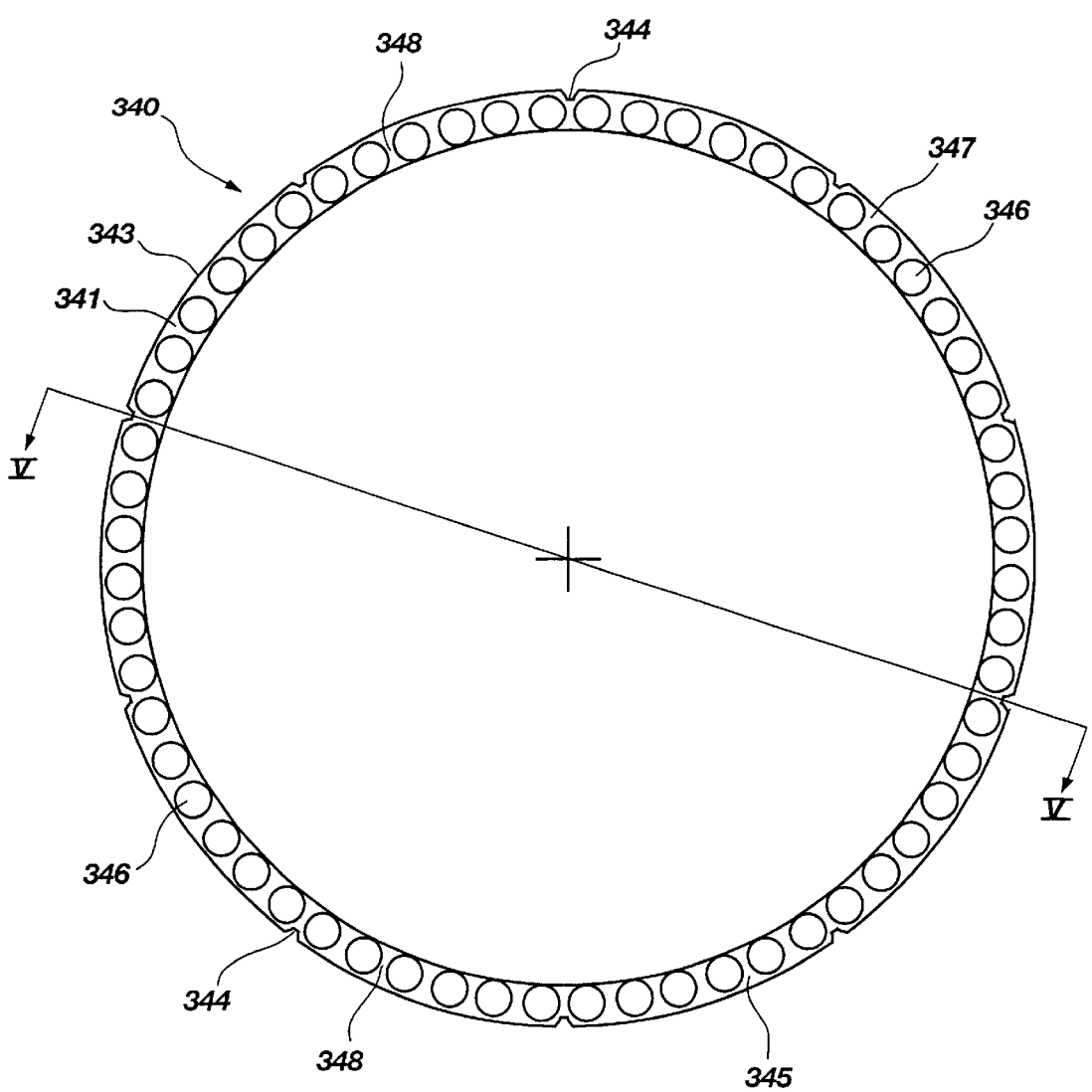
FIG. 4 shows a plan view of a biasing element of a buffer seal according to another embodiment of the invention.
Figure 5:
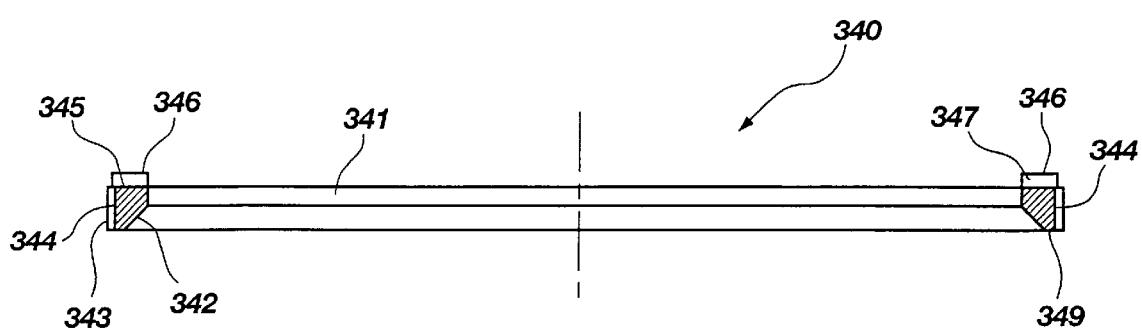
FIG. 5 shows an elevation view of the biasing element shown in FIG. 4.

Referring to FIGS. 4 through 8, a particular embodiment of a biasing element 340 according to the invention is shown. The biasing element 340 comprises a generally ring-shaped body 341 including at least a surface 342 configured to impinge against a sealing element 220. Biasing element 340 also includes an outer cylindrical surface 343, at least a portion of which is configured to impinge against the outer wall 181 of the gland 180 (see FIGS. 6, 7, and 8). Disposed about the periphery of outer cylindrical surface 343 are one or more fluid ports 344. The fluid port or ports 344 may comprise grooves formed in the outer cylindrical surface 343, as shown in FIG. 4, or any other suitable passageway configured to receive fluid as will be explained in greater detail below.

The biasing element 340 further includes a face surface 345 having a plurality of protrusions 346 extending therefrom. The protrusions 346 may be of a generally cylindrical shape as shown in FIG. 4 or of any other suitable configuration. Located axially outward of the face surface 345 and between the plurality of protrusions 346 is a relief volume 347. The relief volume 347 includes a plurality of fluid passageways 348, each fluid passageway 348 extending across the face surface 345 between adjacent protrusions 346. Although configured to provide fluid passageways 348 across the face surface 345 of the ring-shaped body 341 and to provide a relief volume 347 outward of the face surface 345, the plurality of protrusions 346 extending from the face surface 345 of the ring-shaped body 341 further provide a base surface area or "footprint" that is sufficient to stabilize the biasing element 240 against the upstream side wall 182 of the gland 180 and prevent rotation or tilting therein.

As set forth above, one embodiment of a buffer seal 200 according to the invention comprises a buffer seal 200 configured to maintain the back pressure in the region between the buffer seal 200 and the primary seal 150 at a specified threshold fluid pressure. If the back pressure exceeds the threshold pressure, the buffer seal 200 must be able to release a controlled volume of fluid sufficient to restore the back pressure to the threshold pressure limit. The restoration of the threshold pressure is achieved by additional deformation or compression of the biasing element 240, 340 as a result of the increase in back pressure above the threshold pressure. The additional deformation or compression of the biasing element 240, 340 (that is, the deformation or compression of the biasing element 240, 340 in addition to the initial state of deformation or compression of the biasing element 240, 340 resulting from insertion of the buffer seal 200 in its associated gland 180 and from insertion of the rod 11 of first machine element 10 into the bore 21 of second machine element 20) enables the sealing element 220 to displace, thereby forcing the surface 221 of sealing element 220 to separate from the outer cylindrical surface 112 of rod 111 or forcing the surface 222 of sealing element 220 to separate from the downstream side wall 183 of the gland 180 or both.

When sealing contact between the sealing element 220 and either or both of the rod 111 and gland 180 is broken, fluid can flow around the buffer seal 200 to the system side 198 thereof and, as a result, the back pressure between the buffer seal 200 and primary seal 150 is reduced. When the back pressure substantially equals the threshold pressure, the biasing element 240, 340 will return to its initial state of deformation or compression as noted above, to restore sealing contact between the sealing element 220 and both of the rod 111 and gland 180.

The fluid port or ports 344 disposed on the outer cylindrical surface 343 of the biasing element 340 and the plurality of fluid passageways 348 provided in the relief volume 347 between adjacent protrusions 346 cooperatively function to provide a path for fluid to flow around the biasing element 340 when the back pressure exceeds the threshold pressure. Note that an opposing surface 349 of the biasing element 340 may not contact the downstream side wall 183 of the gland 180, resulting in a gap 350 therebetween (see FIGS. 6, 7, and 8). Thus, when the back pressure exceeds the threshold pressure and, via additional deformation or compression of the biasing element 340 as a result of the increased back pressure, the sealing element 220 is displaced causing one or both of its surfaces 221, 222 to separate from the outer cylindrical surface 112 of rod 111 and downstream side wall 183 of gland 180, respectively, fluid within the region 196 between the buffer and primary seals 200, 150 can flow around the periphery of the biasing element 340, through the port or ports 344 and fluid passageways 348, thereby decreasing the volume of fluid between the buffer and primary seals 200, 150 and lowering the back pressure.

The biasing element 340 additionally function to prevent the migration of solid particulates and other contaminants to the primary seal 150. The relief volume 347 provided outward of face surface 345 between protrusions 346 provides a volume in which contaminants and debris can collect or be trapped. Thus, rather than collecting proximate the sealing element 220 where passage to the primary seal 150 is potentially more likely, debris is trapped in the relief volume 347 and may remain therein throughout the life of the buffer seal 200 or until cleaning.

Although the biasing element 340 is shown and described with reference to use with a buffer seal 200 according to the invention, those of ordinary skill in the art will appreciate that many features of the biasing element 340 may be applicable to other types of fluid seals. For example, the fluid path provided by the port or ports 344 and the plurality of passageways 348 between adjacent protrusions 346, the relief volume 347 outward of the face surface 345 between the protrusions 346, and the stability provided by the configuration of the plurality of protrusions 346 (i.e., a large footprint), are all features of the biasing element 340 that are believed generally applicable to all types of fluid seals.

The sealing element 220 may be constructed of any suitable material that is relatively hard in comparison to the compliant biasing element 240, 340. A material for sealing element 220 may also be selected for lubrication and wear characteristics. Materials believed suitable for the sealing element 220 include nylon, Teflon®, composite materials such as bronze-impregnated Teflon®, and any other suitable materials known in the art. The cross-sectional shape of the sealing element 220 may be of any suitable configuration, such as the quarter cylinder shape of the sealing element 220 shown in FIGS. 2 and 3. Alternatively, a generally triangular shape sealing element 220a (see FIG. 6), a generally wedge shape sealing element 220b (see FIG. 7), a generally triangular shape sealing element 220c having a longitudinal extension 229c (see FIG. 8), and a generally rectangular shape sealing element are believed suitable.

Figure 6:
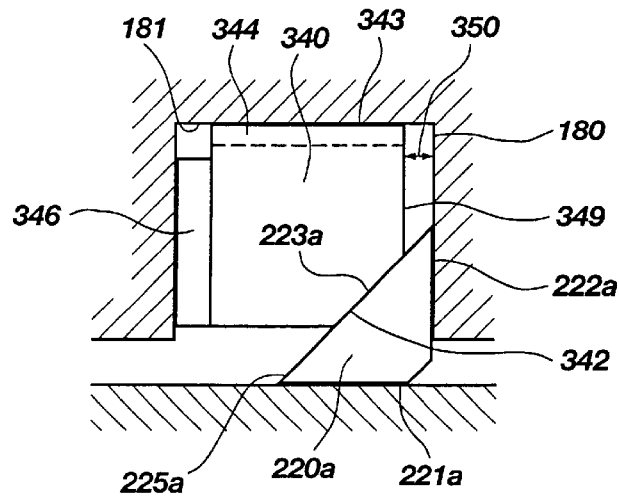
FIG. 6 shows a buffer seal according to another embodiment of the present invention.
Figure 7:
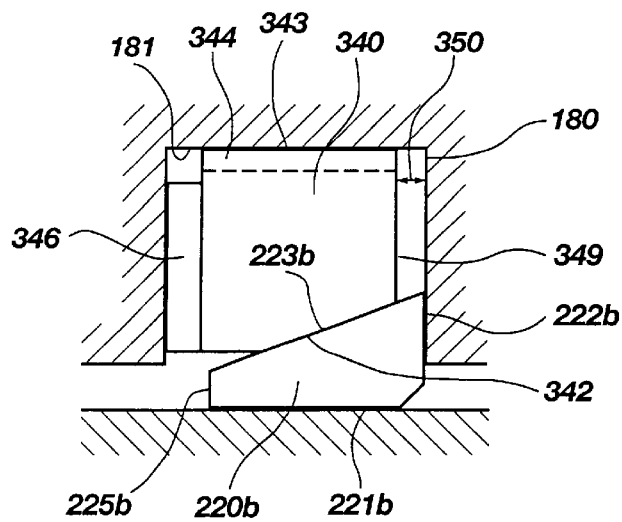
FIG. 7 shows a buffer seal according to a further embodiment of the present invention.
Figure 8:
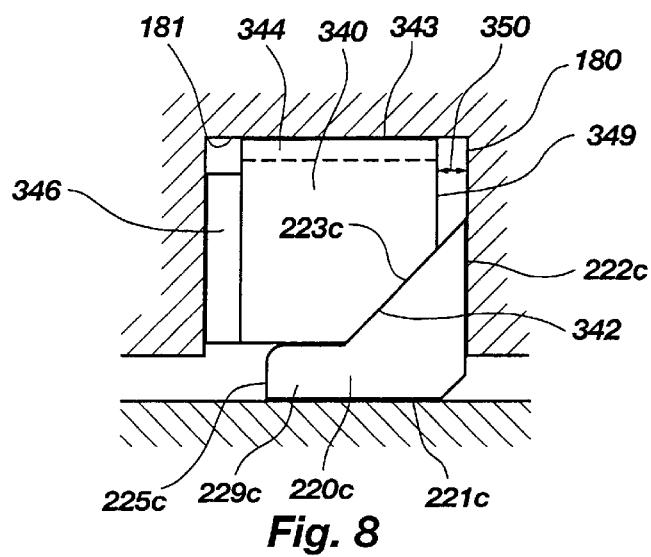
FIG. 8 shows a buffer seal according to yet another embodiment of the present invention.

Each of the embodiments of a sealing element 220a, 220b, 220c shown in FIGS. 6, 7, and 8, respectively, includes a surface 221a, 221b, 221c configured for contacting the outer cylindrical surface 112 of the rod 111 of first machine element 110, a surface 222a, 222b, 222c configured for contacting the downstream side wall 183 of gland 180 in second machine element 120, and a surface 223a, 223b, 223c configured for abutting the biasing element 240, 340, respectively. Further, each of the sealing elements 220a, 220b, 220c may include an edge 225a, 225b, 225c, respectively, configured to function as a scraper or wiper for preventing contaminants from traveling past the sealing element 220 toward the primary seal 150.

Embodiments of a buffer seal 200 according to the present invention having been described in detail, those of ordinary skill in the art will appreciate the many advantages thereof. The buffer seal 200 provides a biasing element 240, 340 configured to maintain a surface 221, 221a, 221b, 221c of a sealing element 220, 220a, 220b, 220c against the outer cylindrical surface 112 of a rod 111 of a first machine element 110 moving within, and relative to, a bore 121 extending through a second machine element 120 and configured to simultaneously maintain another surface 222, 222a, 222b, 222c of the sealing element 220, 220a, 220b, 220c against a wall 183 of a gland 180 formed in the second machine element 120. Also, the buffer seal 200 may be both axially and rotationally constrained to prevent axial travel and tilting of the buffer seal 200 within its mating gland 180, irrespective of the direction of relative motion between the first and second machine elements 10, 20.

The buffer seal 200 may include a biasing element 340 having a relief volume 347 configured to trap system contaminants and/or a sealing element 220, 220a, 220b, 220c having a structure, such as an edge 225, 225a, 225b, 225c, configured to act as a scraper or wiper to prevent the ingress of system contaminants into a region 196 between the buffer seal 200 and a primary seal 150.

In another embodiment, the buffer seal 200 is configured to maintain back pressure in a region 196 between the buffer seal 200 and a primary seal 150 at a specified threshold pressure. To facilitate removal of fluid from the region 196 between the buffer and primary seals 200, 150, the buffer seal 200 may include a biasing element 340 having a port or ports 344 and a plurality of fluid passageways 348 cooperatively configured to provide a fluid path around the buffer seal 200.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the above-described embodiments, as well as alternative arrangements, may be devised by those skilled in the art without departing from the spirit of the present invention and the scope of the appended claims.

What is claimed is:

1. A buffer seal for providing a fluid seal between a first machine element and a relatively movable second machine element, at least said first machine element including a gland disposed about a periphery thereof, said buffer seal disposed between a system providing fluid pressure and a primary seal disposed between said first machine element and said second machine element, said buffer seal comprising:

a sealing element disposed at least partially in said gland and including a generally ring-shaped body having a surface configured to make contact around a periphery thereof with a side wall of said gland and another surface configured to make contact around a periphery thereof with a surface of said second machine element; and a biasing element disposed at least partially in said gland and including a generally ring-shaped resiliently deformable body having a surface configured to make contact around a periphery thereof with said sealing element and form an angular interface therewith relative to an axis of movement of the relatively movable second machine element and including a radial innermost edge of the biasing element configured for contact with a portion of the sealing element, another surface configured to make contact around a periphery thereof with an opposing side wall of said gland, and one other surface configured to make contact around a periphery thereof with an outer wall of said gland, said biasing element configured to provide a biasing force between said sealing element and said opposing side wall of said gland and to provide a biasing force between said sealing element and said outer wall of said gland, wherein said outer surface of said generally ring-shaped resiliently deformable body defines an outer cylindrical surface configured for contact around a periphery thereof with at least a portion of said outer wall of said gland, said another surface of said generally ring-shaped resiliently deformable body defines a face surface substantially transverse to said outer cylindrical surface and configured for contact around a periphery thereof with at least a portion of said opposing side wall of said gland, and wherein said biasing element further comprises:

at least one fluid port extending axially through said body; and a plurality of fluid passageways, each fluid passageway of said plurality of fluid passageways extending across said face surface, said plurality of fluid passageways and said at least one fluid port cooperatively configured to provide a fluid flow path through said body.

2. The buffer seal of claim 1, wherein said sealing element and said biasing element are cooperatively configured to release a controlled volume of fluid from a region between said sealing element and said primary seal when a fluid pressure in said region exceeds a substantially specified pressure.

3. The buffer seal of claim 2, further comprising at least one fluid path defined in said biasing element configured to allow fluid in said region to flow from said region toward said system when said fluid pressure in said region exceeds said substantially specified pressure.

4. The buffer seal of claim 1, wherein said biasing element is configured so as to provide a relief volume for trapping contaminants.

5. The buffer seal of claim 1, wherein said sealing element includes a peripherally extending edge configured as a scraper to remove contaminants from said surface of said second machine element.

6. The buffer seal of claim 1, wherein said biasing element further comprises a plurality of protrusions disposed on said face surface, each protrusion of said plurality of protrusions extending a distance axially from said face surface of said body and terminating at an end face configured for said contact with said at least a portion of said opposing side wall of said gland, a region between said plurality of protrusions and extending substantially said distance from said face surface forming a relief volume configured to trap debris wherein each fluid passageway of said plurality of fluid passageways is configured and located between adjacent protrusions of said plurality of protrusions.

7. The buffer seal of claim 6, wherein said at least one fluid port comprises a groove formed in said outer cylindrical surface of said body and extending from said face surface to said opposing surface.

8. The buffer seal of claim 6, wherein each protrusion of said plurality of protrusions comprises a cylindrical member extending substantially perpendicular to said face surface of said body and including a generally planar end face substantially parallel to said face surface of said body.

9. A buffer seal for providing a fluid seal between a first machine element having a gland disposed about a periphery thereof, and a relatively movable second machine element, said buffer seal disposed between a system providing fluid pressure and a primary seal disposed between said first machine element and said second machine element, said buffer seal comprising:

a sealing element including a generally ring-shaped body having a surface configured to make contact around a periphery thereof with a surface of said first machine element and another surface configured to make contact around a periphery thereof with a surface of said second machine element; and a biasing element including a generally ring-shaped resiliently compressible body, the biasing element comprising:

a surface configured to make contact around a periphery thereof with said seating element and form an angular interface therewith relative to an axis of movement of the relatively movable second machine element and including a radial innermost edge of the biasing element configured for contact with a portion of the sealing element;

an outer cylindrical surface configured for contact around a periphery thereof with at least a portion of an outer wall of said gland;

a face surface substantially transverse to said outer cylindrical surface and configured for contact around a periphery thereof with at least a portion of a side wall of said gland;

at least one fluid port extending axially through said body; and a plurality of fluid passageways, each fluid passageway of said plurality of fluid passageways extending across said face surface between adjacent protrusions of said plurality of protrusions, said plurality of fluid passageways and said at least one fluid port cooperatively configured to provide a fluid flow path through said body;

wherein said biasing element is configured to provide a biasing force between said sealing element and said outer Wall of said gland and to provide a biasing force between said sealing element and said side wall of said gland, said biasing element being further configured to allow a break in contact between at least one of said surface of said sealing element and said surface of said first machine element and said another surface of said sealing element and said surface of said second machine element when a back pressure in a region between said buffer seal and said primary seal exceeds a substantially specified pressure.

10. The buffer seal of claim 9, wherein said sealing element and said biasing element are cooperatively configured to release a controlled volume of fluid from said region when said back pressure in said region exceeds said substantially specified pressure.

11. The buffer seal of claim 10, further comprising at least one fluid path defined in said biasing element configured to allow fluid in said region to flow from said region toward said system when said back pressure in said region exceeds said substantially specified pressure.

12. The buffer seal of claim 9, wherein said biasing element is configured so as to provide a relief volume for trapping contaminants.

13. The buffer seal of claim 9, wherein said sealing element includes a peripherally extending edge configured as a scraper to remove contaminants from at least one of said surface of said first machine element and said surface of said second machine element.

14. The buffer seal of claim 9, wherein said biasing element further comprises a plurality of protrusions disposed on said face surface, each protrusion of said plurality of protrusions extending a distance axially from said face surface of said body and terminating at an end face configured for said contact with said at least a portion of said side wall of said gland, a region between said plurality of protrusions and extending substantially said distance from said face surface forming a relief volume configured to trap debris and wherein each of said plurality of fluid passageways is configured and located between adjacent protrusions of said plurality of protrusions.

15. The biasing element of claim 14, wherein said at least one fluid port comprises a groove formed in said outer cylindrical surface of said body extending from said face surface to said opposing surface.

16. The biasing element of claim 14, wherein each protrusion of said plurality of protrusions comprises a cylindrical member extending substantially perpendicular to said face surface of said body and including a generally planar end face substantially parallel to said face surface of said body.

* * * * *

UNITED STATES PATENT AND TRADEMARK OFFICE
CERTIFICATE OF CORRECTION

PATENT NO. : 6,595,524 B1
DATED : July 22, 2003
INVENTOR(S) : Daniel K. Zitting

It is certified that error appears in the above-identified patent and that said Letters Patent is hereby corrected as shown below:

Column 3,
Line 59, after "20" and before the period insert -- and in contact with an outer wall 81 thereof --

Column 5,
Line 25 and 26, change "contaminates" to -- contaminants --

Column 11,
Line 53, change "function" to -- functions --

Column 14,
Line 54, change "seating" to -- sealing --

Column 15,
Line 10, change "Wall" to -- wall --

Signed and Sealed this

Sixth Day of July, 2004

JON W. DUDAS
*Acting Director of the United States Patent and Trademark Office*